United States Patent
Deng et al.

(10) Patent No.: US 12,532,819 B2
(45) Date of Patent: Jan. 27, 2026

(54) METHOD FOR TAPPING YIELD POTENTIAL OF SACCHARUM OFFICINARUM BY CONTROLLING TIME OF PLASTIC MULCHING

(71) Applicants: Yunnan Academy of Agricultural Sciences, Kunming (CN); Sugarcane Research Institute Yunnan Academy Of Agricultural Sciences, Kaiyuan (CN)

(72) Inventors: Jun Deng, Kunming (CN); Yuebin Zhang, Kunming (CN); Xin Yuan, Kunming (CN); Jun Mao, Kunming (CN); Yong Zhao, Kunming (CN); Rudan Li, Kunming (CN); Jingmei Dao, Kunming (CN); Shaolin Yang, Kunming (CN); Yutong Wang, Kunming (CN); Jing Ai, Kunming (CN)

(73) Assignees: Yunnan Academy of Agricultural Sciences, Kunming (CN); Sugarcane Research Institute Yunnan Academy Of Agricultural Sciences, Kaiyuan (CN)

( * ) Notice: Subject to any disclaimer, the term of this patent is extended or adjusted under 35 U.S.C. 154(b) by 250 days.

(21) Appl. No.: 18/226,336

(22) Filed: Jul. 26, 2023

(65) Prior Publication Data
US 2024/0032453 A1 Feb. 1, 2024

(30) Foreign Application Priority Data
Jul. 29, 2022 (CN) .......................... 202210904566.1

(51) Int. Cl.
*A01G 13/33* (2025.01)
*A01G 22/55* (2018.01)
(Continued)

(52) U.S. Cl.
CPC ............. *A01G 13/33* (2025.01); *A01G 22/55* (2018.02); *G06Q 10/30* (2013.01); *G06Q 50/02* (2013.01)

(58) Field of Classification Search
CPC ........ A01G 13/33; A01G 22/55; G06Q 10/30; G06Q 50/02
See application file for complete search history.

(56) References Cited

U.S. PATENT DOCUMENTS

2016/0000022 A1* 1/2016 Biel Borraz ........... A01G 13/33
47/9
2018/0235159 A1* 8/2018 Chao ...................... A01G 13/20

FOREIGN PATENT DOCUMENTS

AU 2020102201 A4 10/2020
CN 104488432 A 4/2015
(Continued)

OTHER PUBLICATIONS

Gao, H., Yan, C., Liu, Q., Ding, W., Chen, B., & Li, Z. (2019). Effects of plastic mulching and plastic residue on agricultural production: A meta-analysis. Science of the Total Environment, 651, 484-492. (Year: 2019).*

(Continued)

*Primary Examiner* — Carrie S Gilkey
(74) *Attorney, Agent, or Firm* — Bayramoglu Law Offices LLC (57) ABSTRACT

A method for tapping a yield potential of *Saccharum officinarum* by controlling a time of plastic mulching is provided. The method includes: (1) plastic mulching: mulching a *Saccharum officinarum* furrow in a *Saccharum officinarum* field fully with a wide plastic film in a direction parallel to the *Saccharum officinarum* furrow, and covering the plastic film directly above the *Saccharum officinarum* furrow with soil with a certain thickness along the *Saccharum officinarum* furrow, such that the plastic film is tightly attached to (Continued)

soil in the *Saccharum officinarum* furrow; (2) control of the time of plastic mulching, and (3) plastic film recycling treatment. The method of the present disclosure is advanced, practical, easy to operate, and easy to promote.

5 Claims, 1 Drawing Sheet (51) Int. Cl.
*G06Q 10/30* (2023.01)
*G06Q 50/02* (2024.01)

(56) References Cited

FOREIGN PATENT DOCUMENTS

| CN | 105830710 A | 8/2016 |
|---|---|---|
| CN | 106962000 A | 7/2017 |
| CN | 111257539 A | 6/2020 |

OTHER PUBLICATIONS

Xu Shuning, et al., Effects of Different Uncovering Plastic Film Periods on Growth and Cane Yield of Spring Planting Sugarcane in Nanning, Chinese Journal of Tropical Crops, 2016, pp. 75-79, vol. 37 No. 1.

Zumilaiti Tuergan, Effect of Plastic Film Mulching Duration on Cotton Yield Formation and Soil Environment, China Academic Journals (CD-ROM Edition) Electronic Magazine, 2021, pp. 11-32, 51-56.

Li Rudan, et al., Effect of herbicidal membrane cover on the yield and quality of sugarcane, Subtropical Agriculture Research, 2017, pp. 84-87, vol. 13 No. 2.

Xia Wen, et al., Effects of mulching time on water use efficiency and yield of cotton in southern Xinjiang simulated by RZWQM2 model, Transactions of the Chinese Society of Agricultural Engineering, 2021, pp. 140-150, vol. 37 No. 11.

Li Lixia, et al., Experimental Study on Mechanical Properties of Bagasse Fiber for Preparation of Biodegradable Film, Agricultural Mechanization Research, 2018, pp. 177-182, No. 10.

Caiwen Wu, et al., New Technology for High-Yield Cultivation and Processing of Sugar Cane, 2009, pp. 99-100, Yunnan Science and Technology Press.

Xixiang Li, New Cucumber Varieties And High-Quality Cultivation Technology, 2001, pp. 97, China Labor and Social Security Press.

Beijing Modern Market Economy Research Center, Chinese Encyclopedia of Agricultural Science and Technology Planting and Breeding, 2002, pp. 585, Century Audiovisual & Electronic Publishing House.

Wenyao Chen, Guangxi Sugarcane Cultivation, 1991, pp. 317-318, Guangxi Science and Technology Press.

Hong Hong, et al., Sugarcane High Yield and High Sugar Cultivation Technology, Agricultural Science and Technology Promotion Series, 1992, pp. 42-43, Agricultural Publishing House.

Lun Shan, Water Saving Agriculture in China, 2004, pp. 337-340, China Agricultural Publishing House.

Xin Yuan, et al., Enhancing Sugarcane Yield and Weed Control Sustainability with Degradable Film Mulching, Plants, 2025, pp. 1-15, vol. 14, No. 2521.

* cited by examiner

METHOD FOR TAPPING YIELD POTENTIAL OF SACCHARUM OFFICINARUM BY CONTROLLING TIME OF PLASTIC MULCHING

CROSS REFERENCE TO THE RELATED APPLICATION

This application is based on and claims the priority to Chinese Patent Application No. 202210904566.1, filed on Jul. 29, 2022, the entire contents of which are incorporated herein by reference.

TECHNICAL FIELD

The present disclosure belongs to the technical field of agricultural green production, and specifically relates to a method for tapping a yield potential of *Saccharum officinarum* by controlling a time of plastic mulching.

BACKGROUND

Agricultural production and safety are crucial for China, the world's largest agricultural producing and consuming country. With global climate change, water resources are scarce, leading to enormous challenges for sustainable agricultural development. *Saccharum officinarum* (Sugarcane) is an important sugar crop and the main source of sugar in the world. Sugar mainly includes cane sugar and beet sugar. In recent years, cane sugar accounts for about 90% of China's total sugar consumption, making important contributions to ensuring the safety of China's sugar supply. To ensure the sustainable development of China's sugarcane industry, soil water holding capacity plays a crucial role. Plastic mulching can increase soil moisture content, improve water use efficiency, promote photosynthetic accumulation, and increase biomass, playing an important role in the growth and development of sugarcane. Soil temperature is the foundation for the growth and development of sugarcane. Plastic mulching increases soil temperature and accumulated temperature for the growth of sugarcane, promoting early germination, and promoting the growth and development of sugarcane.

The plastic mulching technology was introduced to China in 1978, and has had a significant effect on crop yield increase. The plastic mulching technology has been widely promoted in China, and is mainly applied to crops such as sugarcane, *Zea mays, Nicotiana tabacum, Gossypium hirsutum, Solanum tuberosum, Triticum aestivum*, etc. The plastic mulching technology for sugarcane mainly includes three types: full-film mulching, wide-film double-furrow mulching, and half-film mulching. Rain-feed planting regions of sugarcane are suitable for full-film mulching, irrigated planting regions of sugarcane are suitable for full-film mulching or wide-film double-furrow mulching, and paddy planting regions of sugarcane are suitable for wide-film double-furrow mulching or half-film mulching. These plastic mulching techniques can increase temperature and moisture, effectively solving the problems of low temperature and drought stress in the soil during the planting period of sugarcane, significantly increasing the emergence rate of sugarcane, and promoting an increased yield of sugarcane. The full-film mulching technology was developed and promoted by the Sugarcane Research Institute of the Yunnan Academy of Agricultural Sciences, China, and has been widely promoted and applied in the planting regions of sugarcane in Yunnan Province, China, as well as in Myanmar and Laos. There are small-scale experimental demonstration planting regions of sugarcane using full-film mulching technology in Guangxi and Guangdong Provinces, China. The full-film mulching technology generally requires mulching of sugarcane fields throughout the entire growth period (10-15 months). Currently, due to the high cost of plastic film recycling, sugarcane farmers generally do not carry out plastic film recycling treatment.

The plastic mulching technology has played a significant role in increasing the yield of sugarcane due to its significant warming, moisture retention, and weed control effects. However, if the plastic film is not recycled after continuous years of mulching, it will cause serious pollution due to the migration of plastic residues to deep soil, making it difficult to repair the soil, and meanwhile reducing the soil organic carbon and harming sustainable agricultural development. Plastic residues will significantly affect soil bulk density, porosity, saturated hydraulic conductivity, bacterial community, and volatile substances, resulting in a decrease in plant biomass and changes in nutritional status. Meanwhile, plastic residues will change the soil water storage dynamics and crop water consumption, directly affecting crop yield throughout the entire growth period. Therefore, the production and migration of the microplastics seriously restricts the development of agricultural ecosystems. The microplastics can interact with crops to enter the food chain, posing a great threat to human health. In short, the application of traditional ordinary plastic mulching is not conducive to sustainable agricultural development and seriously endangers the soil environment.

In recent years, people's awareness of environmental protection has continuously increased, and the Chinese government attaches great importance to improving the quality of arable land and plastic film pollution. It is necessary to reduce plastic film pollution and cultivate healthy soil in planting regions of sugarcane, while improving the quality of arable land and ensuring the safety of national sugar supply. This is a technical challenge faced by industry technology personnel and a "bottleneck" for the high-quality development of the sugar industry. In this context, it has become a main direction of high-yield technology research to tap the high yield potential of sugarcane and regulate the yield formation of sugarcane by optimizing the planting process of sugarcane.

SUMMARY

In order to address the problems described in the BACKGROUND, the present disclosure proposes an advanced, practical, easy-to-operate, and easy-to-promote method for tapping a yield potential of sugarcane by controlling a time of plastic mulching.

To solve the above technical problems, the present disclosure adopts the following technical solutions.

The method for tapping a yield potential of sugarcane by controlling a time of plastic mulching precisely regulates the time of plastic mulching to achieve yield increase of sugarcane and income increase of a sugarcane farmer, and specifically includes the following steps:
 (1) plastic mulching: mulching a sugarcane furrow in a sugarcane field fully with a wide plastic film in a direction parallel to the sugarcane furrow, and covering the plastic film directly above the sugarcane furrow with soil with a certain thickness along the sugarcane furrow, such that the plastic film is tightly attached to soil in the sugarcane furrow;

(2) control of the time of plastic mulching: performing, based on two-year data including a complete degradation condition of the plastic film mulching a soil surface and a yield change pattern of sugarcane, logistic fitting on a yield impact according to a regression equation $$y = \frac{k}{\left(1 + ae^{-bt}\right)},$$

and deriving a curve equation $$y = \frac{1.55}{\left(1 + 3.5e^{-2.16t}\right)};$$

accurately controlling the time of plastic mulching at three time points, namely $$t_1 = \frac{(\ln a - 1.317)}{b}, t_2 = \frac{\ln a}{b}, \text{ and } t_3 = \frac{(\ln a + 1.317)}{b};$$

deriving, through 100-times descent iterative fitting, three time points as endpoints, namely day 0, day 58, and day 119, where $t_1$ is −3 through a formula calculation, but considering that the time of plastic mulching is a non-negative number, it is limited to 0, meaning that no plastic mulching is performed; in iterative fitting, through observation, there is no significant yield change after a time point defined by day 156; and therefore, the time of plastic mulching is divided into four mulching periods, namely a mulching period with a medium-to-low yield, defined by days 0-58, with a yield of 32.8-77.5 t/ha, a mulching period with a medium-to-high yield potential, defined by days 58-119, with a yield potential of 77.5-122.2 t/ha, a mulching period with a high yield potential, defined by days 119-156, with a yield potential of 122.2-138.8 t/ha, and an ineffective mulching period after day 156, with no significant yield increase; and (3) plastic film recycling treatment: cleaning, by a plastic film recycling machine or a manual recycling method, the plastic film out of the sugarcane field, removing the soil on the plastic film, and sending the plastic film to a plastic film recycling station for centralized treatment.

Further, preferably, in step (1), the plastic film is a commercially available fully biodegradable film, weeding polyethylene film or ordinary polyethylene film.

Further, preferably, in step (1), the plastic film has a width of 1.5-1.8 m and a thickness of 0.010-0.012 mm.

Further, preferably, in step (1), the plastic film is intended for a fully mulching purpose, with an overlap of about 10 cm with another plastic film.

Further, preferably, in step (1), the thickness of the covering soil is 3-4 cm.

Further, preferably, in step (2), the time of plastic mulching is controlled at the three time points, namely day 0, day 58, and day 119; if the plastic film is a fully biodegradable film, the three time points refer to a degradation starting time of the fully biodegradable film; and if the plastic film is a weeding polyethylene film or an ordinary polyethylene film, the three time points refer to an uncovering time of the weeding polyethylene film or the ordinary polyethylene film.

Further, preferably, in step (3), regarding the centralized treatment of the plastic film, the recycled plastic film is pelletized by the plastic film recycling station for the production of a secondary plastic product.

Further, in addition to steps (1), (2), and (3), this technical solution also involves such tasks as variety selection, plowing and furrowing, planting and soil covering, fertilization and pesticide application, inter-tillage management, and sugarcane harvesting, all of which are available in the prior art.

An embodiment of the present disclosure further provides a method for tapping a yield potential of sugarcane by controlling a time of plastic mulching, including:

(1) performing, based on two-year data of a test site including a complete degradation condition of a plastic film covering a soil surface and a yield change pattern of a standard variety of sugarcane, logistic fitting on a yield impact according to a regression equation $$y = \frac{k}{\left(1 + ae^{-bt}\right)},$$

and determining corresponding values of k, a, and b in the regression equation;

(2) calculating, based on the corresponding values of k, a, and b, three time points, namely $$t_1 = \frac{(\ln a - 1.317)}{b}, t_2 = \frac{\ln a}{b}, \text{ and } t_3 = \frac{(\ln a + 1.317)}{b};$$

deriving, through 100-times descent iterative fitting, mulching days corresponding to the three time points, namely $T_1$, $T_2$, and $T_3$, where $T_1$-$T_2$ defines a mulching period with a medium-to-low yield potential; $T_2$-$T_3$ defines a mulching period with a medium-to-high yield potential; and $T_3$-∞ defines a mulching period with a high yield potential; and (3) substituting the mulching days $T_1$, $T_2$, and $T_3$ into a curve equation of 100-times descent iterative fitting to derive yield potentials corresponding to the mulching days, namely $Y_1$, $Y_2$, and $Y_3$, where a yield potential defined by $Y_1$-$Y_2$ corresponds to the mulching period with a medium-to-low yield potential, a yield potential defined by $Y_2$-$Y_3$ corresponds to the mulching period with a medium-to-high yield potential, and a yield potential greater than $Y_3$ corresponds to the mulching period with a high yield potential.

Further, preferably, the method includes: selecting a mulching day $T_4$ from a curve of 100-times descent iterative fitting, where a daily yield increase after 74 is less than 5%; correcting the mulching period with a high yield potential to $T_3$-$T_4$ and the ineffective mulching period to $T_4$-∞; and calculating a yield potential $Y_4$ corresponding to the mulching day $T_4$, and correcting the yield potential corresponding to the mulching period with a high yield potential to $Y_3$-$Y_4$.

Further, preferably, the mulching day $T_1$ is non-negative; and if $T_1$ is calculated as negative, $T_1$ is taken as 0. $T_2$ and $T_3$ should also be non-negative, but since there will be no negative results during the calculation process, no correction is needed.

Further, preferably, the method includes: correcting, if there is a temperature difference between a target planting site and the test site, the mulching days $T_1$, $T_3$, and $T_4$ respectively through temperature correction coefficients $\alpha_1$, $\alpha_2$, and $\alpha_3$, where after correction, $T_2' = \alpha_1 T_2$, and $\alpha_1$ denotes a ratio of an average temperature of a soil layer in the test site during the mulching period with a medium-to-low yield potential to an average temperature of a soil layer in the target planting site during the mulching period with a medium-to-low yield potential; $T_3'=\alpha_2 T_3$, and $\alpha_2$ denotes a ratio of an average temperature of the soil layer in the test site during the mulching period with a medium-to-high yield potential to an average temperature of the soil layer in the target planting site during the mulching period with a medium-to-high yield potential; and $T_4'=\alpha_3 T_4$, and $\alpha_3$ denotes a ratio of an average temperature of the soil layer in the test site during the mulching period with a high yield potential to an average temperature of the soil layer in the target planting site during the mulching period with a high yield potential. Preferably, the average temperature of the soil layer usually refers to the average temperature of a soil layer at a depth of 5-20 cm. More preferably, the average temperature of the soil layer refers to the average temperature of a soil layer at a depth of 10 cm.

It should be noted that in calculating $\alpha_1$, the length of the target planting site's mulching period with a medium-to-low yield potential is uncertain. Therefore, for the convenience of calculation, the specific length of the target planting site's mulching period with a medium-to-low yield potential is calculated based on the length of the test site's mulching period with a medium-to-low yield potential. $\alpha_2$ and $\alpha_3$ are calculated in the same way. For example, if the test site's mulching period with a medium-to-low yield potential is 60 days, after correction, the target planting site's mulching period with a medium-to-low yield potential may be greater than 60 days or less than 60 days. However, since $\alpha_1$ is undetermined, it is not possible to accurately determine the length of the target planting site's mulching period with a medium-to-low yield potential. To simplify the calculation, when the average temperature of the soil layer in the target planting site is measured, it is also calculated based on 60 days.

In addition, the present disclosure also tests other environmental parameters. The impact of other environmental parameters on the calculation results is not significant, so they are not corrected in the present disclosure. For example, in terms of altitude, simple changes in altitude do not have a significant impact on the yield of sugarcane. The impact of altitude is more reflected in the temperature changes it brings, which can be corrected through the temperature correction coefficients. Similarly, the impact of planting time is reflected in the temperature difference it brings, which can be corrected through the temperature correction coefficients. For another example, in terms of soil moisture, although moisture has a significant impact on the yield of sugarcane, early watering ensures that the soil is at the most suitable soil moisture. After mulching, the soil moisture changes very little and its impact can be ignored. Therefore, the present disclosure also does not involve soil moisture correction.

Further, preferably, the method includes: correcting, if there is a difference between an actual variety of sugarcane planted and the standard variety of sugarcane, the yield potential through a variety correction coefficient $\beta$, where after correction, $Y_1'=\beta Y_1$, $Y_2'=\beta Y_2$, $Y_3'=\beta Y_3$, and $Y_4'=\beta Y_4$; the variety correction coefficient $\beta$ is an empirical value that is trained and adjusted through acquired learning.

Further, preferably, if the plastic film is a fully biodegradable film, the mulching day T of the plastic film lasts until a day when a 5-20 cm crack or break occurs in a surface of the plastic film.

Further, preferably, if the plastic film is a weeding polyethylene film or an ordinary polyethylene film, the mulching day T of the plastic film lasts until an uncovering time of the plastic film.

Compared with the prior art, the present disclosure has the following beneficial effects:

(1) The present disclosure changes the traditional plastic mulching mode and achieves precise control on the time of plastic mulching.

The present disclosure effectively solves the problems that affect the high-quality development of the sugarcane industry. For example, the new-type fully biodegradable film has a too short mulching time (1-2 months), the traditional polyethylene film has a too long mulching time (throughout the growth period, 10-15 months) and a too early uncovering time (about 2 months). As a result, the yield potential of sugarcane cannot be tapped, and the residual plastic film affects the quality of farmland in the planting regions of sugarcane. The present disclosure taps the yield potential of sugarcane by accurately controlling the time of plastic mulching, overcoming the shortcomings of traditional plastic mulching technology. Years of practical research have shown that within a certain period of time, the time of plastic mulching significantly affects the yield of sugarcane above ground, and there is a highly significant correlation between the time of plastic mulching and the yield of sugarcane above ground. The present disclosure facilitates planters to determine the optimal uncovering time and evaluate the approximate yield of sugarcane, making it easy to tap the yield potential of sugarcane.

(2) The present disclosure can effectively avoid "white pollution" of the plastic film and is beneficial for protecting the ecological environment in planting regions of sugarcane in China.

The present disclosure adopts a fully biodegradable film encouraged by the Chinese government. The fully biodegradable film can be degraded by soil microorganisms, and decompose water and carbon dioxide without polluting the soil, effectively avoiding the pollution of sugarcane fields by the white plastic film. The fully biodegradable film also has a weeding function, reducing the use of herbicides in sugarcane fields and achieving the goal of reducing pesticide input. It is an environmentally friendly technical solution. The present disclosure applies a polyethylene film in sugarcane fields and recycles it for the production of a secondary plastic product, achieving maximum utilization of the residual film in sugarcane fields, avoiding soil pollution caused by film residue, and ensuring normal growth and development of sugarcane. However, with the increase of time and residue, the yield of sugarcane will significantly decrease. The planting regions of sugarcane in Yunnan and Guangxi in China are national production reserves of sugarcane, with an area of 15 million acres. The demand for the plastic film for sugarcane production is enormous. If the plastic film is not recycled, it will cause environmental problems that cannot be ignored. Meanwhile, when the residual plastic film migrates to deep soil, it will lead to a decrease in soil organic carbon and significantly affect soil bulk density, porosity, saturated hydraulic conductivity, bacterial community, volatile substances, etc. In particular, microplastics can interact with sugarcane to enter the food chain, posing a great threat to human health, which is not conducive to sustainable agricultural development. Research has found that continuous use of polyethylene film mulching can reduce the yield of sugarcane by 5.7 t/ha.

(3) The present disclosure can significantly increase the benefits of sugarcane planting and harvesting for sugarcane farmers, and has significant economic and social benefits.

The present disclosure has significant ecological benefits and has a significant promoting effect in tapping the yield potential of sugarcane, significantly increasing the yield of newly planted sugarcane and perennial sugarcane. In the 2021/2022 crushing season, the average yield of sugarcane in Yunnan province was only 72.0 t/ha. A two-year field experiment conducted in Kaiyuan City, Honghe Prefecture, Yunnan Province showed that for newly planted sugarcane mulched with a 0.010 mm degradable film for 156 days, the yield of sugarcane reached 146.2 t/ha, the benefit of sugarcane planting reached 73,100 yuan/ha, and the benefit of sugarcane harvesting reached 33,600 yuan/ha (calculated based on the local purchasing price of sugarcane, namely 500 yuan/t, and the manual harvesting price of sugarcane, namely 230 yuan/t, the same below). For perennial sugarcane mulched for 141 days, the yield of sugarcane reached 150.1 t/ha, the benefit of sugarcane planting reached 75,100 yuan/ha, and the benefit of sugarcane harvesting reached 34,500 yuan/ha. For mulching with a 0.010 mm ordinary polyethylene film throughout the growth period, the yield of newly planted sugarcane reached only 151.8 t/ha, the benefit of sugarcane planting reached 75,900 yuan/ha, and the benefit of sugarcane harvesting reached 34,900 yuan/ha; and the yield of perennial sugarcane was reduced to 144.4 t/ha, the benefit of sugarcane planting reached 72,200 yuan/ha, and the benefit of sugarcane harvesting reached 33,200 yuan/ha. With the tapping of the yield potential of sugarcane, the amount of sugarcane as raw materials for local sugar mills was increased, increasing the sugar production capacity of sugar mills, improving enterprise revenue, and significant promoting the safety of national sugar supply.

BRIEF DESCRIPTION OF THE DRAWINGS

To describe the technical solutions in the embodiments of the present disclosure more clearly, the drawings required for describing the embodiments are briefly described below. It should be understood that the following drawings show merely some embodiments of the present disclosure, and thus should not be regarded as a limitation to the scope. A person of ordinary skill in the art may still derive other related drawings from these drawings without creative efforts.

DETAILED DESCRIPTION OF THE EMBODIMENTS

Figure 1:
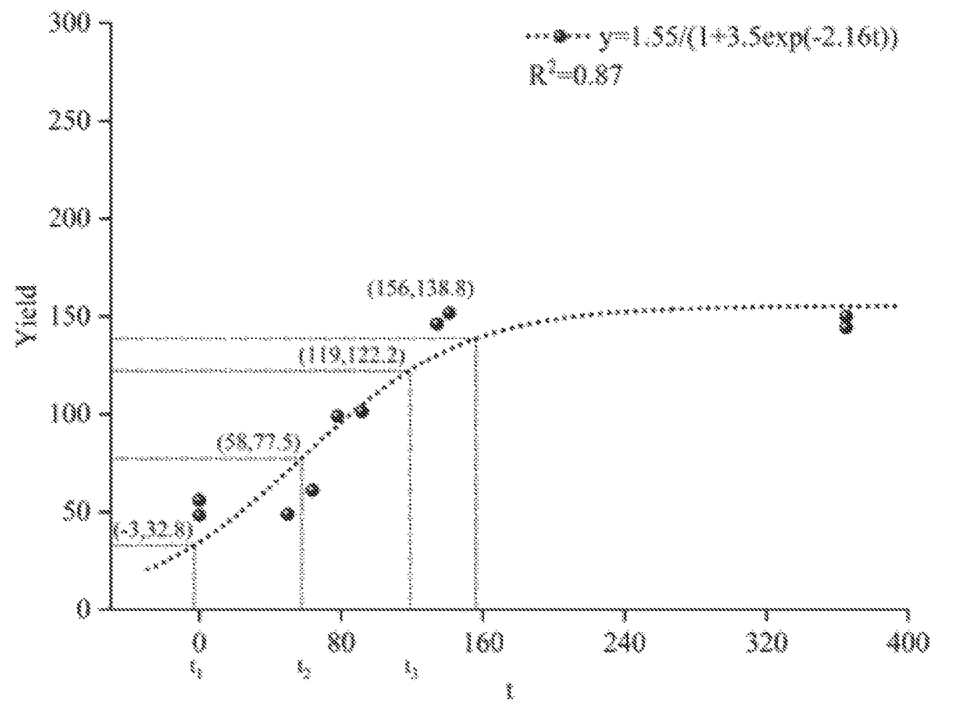
FIGURE is a fitting curve of a time of plastic mulching and a yield of sugarcane according to the present disclosure.

To make the objective, technical solutions, and advantages of the examples of the present disclosure clearer, the technical solutions in the examples of the present disclosure will be described clearly and completely below. If no specific conditions are specified in the examples, the examples will be implemented under conventional conditions or the conditions recommended by the manufacturer. If the reagents or instruments used do not indicate the manufacturer, they are all conventional products that can be commercially available.

A method for tapping a yield potential of sugarcane by controlling a time of plastic mulching according to an embodiment of the present disclosure is specifically described below.

The features and properties of the present disclosure are further described in detail below in conjunction with examples.

Embodiment 1

The present disclosure provides a method for tapping a yield potential of sugarcane by controlling a time of plastic mulching. The method specifically includes the following steps:

(1) A test site is located at the Lengshuigou Base of the Sugarcane Research Institute of the Yunnan Academy of Agricultural Sciences (in Kaiyuan City, Yunnan Province, China), and a standard variety of sugarcane is Yunzhe 081609.

(2) Based on two-year data of a test site including a complete degradation condition of a plastic film covering a soil surface and a yield change pattern of a standard variety of sugarcane, logistic fitting is performed on a yield impact according to a regression equation $$y = \frac{k}{(1 + ae^{-bt})},$$

and corresponding values of k, a, and b in the regression equation are determined, that is, k=1.55, a=3.5, and b=2.16. Therefore, through the fitting, a curve equation is derived, namely $$y = \frac{1.55}{(1 + 3.5e^{-2.16t})}$$

(shown in the FIGURE).

(3) Based on the corresponding values of k, a, and b, three time points, namely $$t_1 = \frac{(\ln a - 1.317)}{b}, t_2 = \frac{\ln a}{b}, \text{ and } t_3 = \frac{(\ln a + 1.317)}{b},$$

are calculated. Through 100-times descent iterative fitting, three mulching days corresponding to the three time points are derived, namely $T_1=-3$, $T_2=58$, and $T_3=119$. $T_1$ is taken as 0, and a mulching day $T_4=156$ is selected from a curve of 100-times descent iterative fitting. Therefore, a mulching period with a medium-to-low yield potential is defined by days 0-58, a mulching period with a medium-to-high yield potential is defined by days 58-119, a mulching period with a high yield potential is defined by days 119-156, and an ineffective mulching period is defined by a period after day 156.

(4) The mulching days $T_1$, $T_2$, $T_3$, and $T_4$ are substituted into a curve equation of 100-times descent iterative fitting to derive yield potentials corresponding to the mulching days, namely $Y_1=32.8$ t/ha, $Y_2=77.5$ t/ha, $Y_3=122.2$ t/ha, and $Y_4=138.8$ t/ha. A yield potential corresponding to the mulching period with a medium-to-low yield potential is 32.8-77.5 t/ha, a yield potential corresponding to the mulching period with a medium-to-high yield potential is 77.5-122.2 t/ha, and a yield potential corresponding to the mulching period with a high yield potential is 122.2-138.8 t/ha.

(5) Based on the standard variety of sugarcane, some common varieties of sugarcane in Yunnan were tested using a single variable method. By comparing the yield differences derived with the single variable method, a variety correction coefficient of sugarcane is derived, as shown in Table 1.

TABLE 1

Variety Correction Coefficient of sugarcane

| Variety | Yunzhe081609 | Yunzhe0551 | Yunzhe15505 | Liucheng05-136 | Yuetang93-159 |
|---|---|---|---|---|---|
| β | / | 1 | 0.98 | 0.88 | 0.98 |

It should be noted that the variety correction coefficient of sugarcane is generated based on the standard variety of sugarcane. If there is a change in the standard variety of sugarcane, the variety correction coefficient of sugarcane will change accordingly. The variety correction coefficient of sugarcane is an empirical value that can be continuously adjusted and optimized in actual production. For a sugarcane variety not shown in Table 1, the correction coefficient can also be assigned, adjusted, and optimized in the same way.

Application Example 1

This application example tests the method for tapping a yield potential of sugarcane by controlling a time of plastic mulching specifically according to the following steps.

(1) Variety selection. A high-quality sugarcane variety, Yunzhe 081609, was selected. In January, healthy seedlings of the high-quality sugarcane variety were planted at the Lengshuigou Base in Kaiyuan City, Honghe Prefecture, Yunnan Province.

(2) Plowing and furrowing. Deep plowing, deep loosening, and fine raking were carried out in a sugarcane field to finely break the soil. A sugarcane furrow was excavated along a contour line, with a depth of 40 cm, a bottom width of 25 cm, and a row spacing of 120 cm.

(3) Fertilization and pesticide application. 1,800 kg/ha of biological manure and 600 kg/ha of slow release fertilizer specially formulated for sugarcane were applied in the sugarcane furrow. For a sugarcane field with aphids and borers, 0.6 kg/ha of slow-release, low-toxicity, and efficient pesticide Fuge was mixed with fertilizer and applied to the sugarcane furrow for one time.

(4) Planting and soil covering. After the sugarcane furrow was excavated, the seedlings were planted in a timely manner, 10,000 seedlings per mu. After planting, the seedlings were mulched with about 10 cm of soil in a timely manner.

(5) Watering. After planting and soil covering, the seedlings were watered in a timely manner, with a watering amount of about 5 t.

(6) Mulching and soil covering. A fully biodegradable film with a width of 1.8 m, a thickness of 0.010 mm, and a degradation time of 100 days was used to mulch the sugarcane field in a direction parallel to the sugarcane furrow. The fully biodegradable film directly above the sugarcane furrow was mulched with 4 cm thick soil along the sugarcane furrow. The fully biodegradable film was overlapped for about 10 cm.

(7) Inter-tillage management. During the peak tillering period of sugarcane and after the degradation of the plastic film, inter-tillage, fertilization, and ridging were carried out in a timely manner. 1,200 kg/ha of slow-release fertilizer specifically formulated for sugarcane was applied. After fertilization, soil was ridged for a thickness of approximately 10 cm. During the elongation period of sugarcane, air tractors were flied for crop-dusting in a timely manner based on the pest condition.

(8) Harvesting. After the sugarcane matured, it was manually cut into the soil at a depth of 5 cm.

Application Examples 2 to 10

Application Examples 2 to 10 make minor adjustments based on Application Example 1, and the main differences are shown in Table 2.

TABLE 2

Planting Parameters of sugarcane

| Application Example | Variety | Planting time | Location | Film type | Film thickness/mm | Degradation (uncovering) time/day |
|---|---|---|---|---|---|---|
| Application Example 1 | Yunzhe081609 | January | Lengshuigou, Kaiyuan City, Honghe Prefecture, Yunnan Province | Fully biodegradable film | 0.01 | 100 |
| Application Example 2 | Yunzhe0551 | March | Xiayun Village, Shangyun Town, Lancang County, Pu'er City, Yunnan Province | Polyethylene film | 0.01 | 119 |
| Application Example 3 | Yunzhe15505 | March | Baomu Village, Fengshan Town, Jinggu County, Pu'er City, Yunnan Province | Fully biodegradable film | 0.01 | 90 |
| Application Example 4 | Yunzhe081609 | February | Menghai County, Xishuangbanna Prefecture, Yunnan Province | Fully biodegradable film | 0.01 | 120 |
| Application Example 5 | Liucheng05136 | March | Yun County, Lincang City, Yunnan Province | Fully biodegradable film | 0.012 | 75 |
| Application Example 6 | Yuetang93159 | March | Nongba Village, Gengma Town, Gengma County, Lincang City, Yunnan Province | Fully biodegradable film | 0.01 | 90 |

TABLE 2-continued

Planting Parameters of sugarcane

| Application Example | Variety | Planting time | Location | Film type | Film thickness/mm | Degradation (uncovering) time/day |
|---|---|---|---|---|---|---|
| Application Example 7 | Yunzhe0551 | December | Mangguo Village, Gengma Town, Gengma County, Lincang City, Yunnan Province | Polyethylene film | 0.01 | 130 |
| Application Example 8 | Yunzhe081609 | January | Guichao Town Planting Region, Funing County, Wenshan Prefecture, Yunnan Province | Polyethylene film | 0.01 | 120 |
| Application Example 9 | Yunzhe081609 | January | Guichao Town Planting Region, Funing County, Wenshan Prefecture, Yunnan Province | Polyethylene film | 0.01 | 50 |
| Application Example 10 | Yunzhe081609 | January | Guichao Town Planting Region, Funing County, Wenshan Prefecture, Yunnan Province | Polyethylene film | 0.01 | 160 |

Test Example 1

Based on the function of Embodiment 1, the actual parameters of Application Examples 1 to 10 were corrected, and the correction results are shown in Table 3.

TABLE 3

Function Correction Results (T in days; and Y in t · ha$^{-1}$)

| Application Example | $\alpha_1$ | $\alpha_2$ | $\alpha_3$ | $T_2'$ | $T_3'$ | $T_4'$ | $\beta$ | $Y_1'$ | $Y_2'$ | $Y_3'$ | $Y_4'$ |
|---|---|---|---|---|---|---|---|---|---|---|---|
| Embodiment 1 | 1.00 | 1.00 | 1.00 | 58 | 119 | 156 | 1.00 | 32.8 | 77.5 | 122.2 | 138.8 |
| Application Example 1 | 0.915 | 0.896 | 0.897 | 53 | 107 | 140 | 1.00 | 32.8 | 77.5 | 122.2 | 138.8 |
| Application Example 2 | 0.798 | 0.821 | 0.868 | 46 | 98 | 135 | 1.00 | 32.8 | 77.5 | 122.2 | 138.8 |
| Application Example 3 | 0.763 | 0.784 | 0.833 | 44 | 93 | 130 | 0.98 | 32.1 | 76.0 | 119.8 | 136.0 |
| Application Example 4 | 0.946 | 0.924 | 0.956 | 55 | 110 | 149 | 1.00 | 32.8 | 77.5 | 122.2 | 138.8 |
| Application Example 5 | 0.785 | 0.802 | 0.844 | 46 | 95 | 132 | 0.88 | 28.9 | 68.2 | 107.5 | 122.1 |
| Application Example 6 | 0.804 | 0.825 | 0.868 | 47 | 98 | 135 | 0.98 | 32.1 | 76.0 | 119.8 | 136.0 |
| Application Example 7 | 1.103 | 1.035 | 1.043 | 64 | 123 | 163 | 1.00 | 32.8 | 77.5 | 122.2 | 138.8 |
| Application Example 8 | 0.935 | 0.927 | 0.910 | 54 | 110 | 142 | 1.00 | 32.8 | 77.5 | 122.2 | 138.8 |
| Application Example 9 | 0.935 | 0.927 | 0.910 | 54 | 110 | 142 | 1.00 | 32.8 | 77.5 | 122.2 | 138.8 |
| Application Example 10 | 0.935 | 0.927 | 0.910 | 54 | 110 | 142 | 1.00 | 32.8 | 77.5 | 122.2 | 138.8 |

The actual degradation (uncovering) times in Application Examples 1 to 10 were recorded, the mulching periods were determined according to Table 3, and the yield range was estimated. By comparing the estimated yield with the actual yield, the accuracy of the function was determined, with the results shown in Table 4.

TABLE 4

Function Accuracy Test

| Application Example | Degradation (uncovering) time/day | Mulching period | Estimated yield/ t · ha$^{-1}$ | Actual yield Y/ t · ha$^{-1}$ | Does it comply with the corrected function |
|---|---|---|---|---|---|
| Application Example 1 | 100 | Mulching period with a medium-to-high yield potential | 77.5-122.2 | 115.20 | Yes |
| Application Example 2 | 119 | Mulching period with a high yield potential | 122.2-138.8 | 128.70 | Yes |
| Application Example 3 | 90 | Mulching period with a medium-to-high yield potential | 76.0-119.8 | 108.90 | Yes |

TABLE 4-continued

Function Accuracy Test

| Application Example | Degradation (uncovering) time/day | Mulching period | Estimated yield/ t·ha⁻¹ | Actual yield Y/ t·ha⁻¹ | Does it comply with the corrected function |
|---|---|---|---|---|---|
| Application Example 4 | 120 | Mulching period with a high yield potential | 122.2-138.8 | 132.90 | Yes |
| Application Example 5 | 75 | Mulching period with a medium-to-high yield potential | 68.2-107.5 | 95.85 | Yes |
| Application Example 6 | 90 | Mulching period with a medium-to-high yield potential | 76.0-119.8 | 107.85 | Yes |
| Application Example 7 | 130 | Mulching period with a high yield potential | 122.2-138.8 | 138.00 | Yes |
| Application Example 8 | 120 | Mulching period with a high yield potential | 122.2-138.8 | 138.25 | Yes |
| Application Example 9 | 50 | Mulching period with a medium-to-low yield potential | 32.8-77.5 | 76.50 | Yes |
| Application Example 10 | 160 | Ineffective mulching period | ≥138.8 | 138.80 | Yes |

As shown in Table 4, the method of the present disclosure can accurately estimate the impact of different times of plastic mulching on the yield of sugarcane. The present disclosure takes three time points, namely $T_2'$, $T_3'$, and $T_4'$ as endpoints to divide the time of plastic mulching into four mulching periods, namely a mulching period with a medium-to-low yield potential, defined by $0$-$T_2'$; a mulching period with a medium-to-high yield potential, defined by $T_2'$-$T_3'$ a mulching period with a high yield potential, defined by $T_3'$-$T_4'$; and an ineffective mulching period after $T_4'$, during which the yield of sugarcane is no longer significantly increased.

The present disclosure presents a local application example in Yunnan. The present disclosure takes three time points, namely day 58, day 119, and day 156, as endpoints to divide the time of plastic mulching into four mulching periods, namely a mulching period with a medium-to-low yield potential, defined by days 0-58, with a yield of 32.8-77.5 t/ha; a mulching period with a medium-to-high yield potential, defined by days 58-119, with a yield potential of 77.5-122.2 t/ha; a mulching period with a high yield potential, defined by days 119-156, with a yield potential of 122.2-138.8 t/ha; and an ineffective mulching period after day 156, during which the yield of sugarcane is no longer significantly increased.

The method of the present disclosure is not limited to the local application in Yunnan Province. When the method of the present disclosure is applied to other sugarcane varieties in other regions, further in-depth research is needed according to local conditions, so as to further optimize the variety correction coefficient of sugarcane and the yield potential range of different sugarcane varieties.

The above described are merely preferred embodiments of the present disclosure and is not intended to limit the present disclosure, and various changes and modifications of the present disclosure may be made by those skilled in the art. Any modifications, equivalent substitutions, improvements, etc. made within the spirit and scope of the present disclosure should be included within the protection scope of the present disclosure.

What is claimed is:

1. A method for tapping a yield potential of sugarcane by controlling an uncovering time of a plastic mulching, comprising the following steps:
   (1) planting sugarcane seedlings in a sugarcane furrow in a sugarcane field, covering with soil and watering the sugarcane seedlings;
   (2) applying the plastic mulching, wherein the plastic mulching comprises covering the sugarcane furrow fully with a plastic film directly above the sugarcane furrow in a direction parallel to the sugarcane furrow, and covering the plastic film with a soil with a predetermined thickness along the sugarcane furrow, such that the plastic film is tightly attached to the soil in the sugarcane furrow, wherein the plastic film is a fully biodegradable film, a weeding polyethylene film, or an ordinary polyethylene film;
   (3) determining an optimal uncovering time for the plastic mulching by: performing, based on two-year data comprising a complete degradation condition of the plastic film mulching a soil surface and a yield change pattern of the sugarcane, a logistic fitting on a yield impact according to a regression equation $$y = \frac{k}{\left(1 + ae^{-bt}\right)},$$

and deriving a curve equation $$y = \frac{1.55}{\left(1 + 3.5e^{-2.16t}\right)};$$

accurately determining the time of plastic mulching at three time points, namely $$t_1 = \frac{(\ln a - 1.317)}{b}, t_2 = \frac{\ln a}{b}, \text{ and } t_3 = \frac{(\ln a + 1.317)}{b};$$

deriving, through a 100-times descent iterative fitting, the three time points as endpoints, namely day 0, day 58, and day 119, wherein $t_1$ is −3 through a formula calculation, but considering that the time of plastic mulching is a non-negative number, $t_1$ is limited to 0; in the 100-times descent iterative fitting, through an observation, there is no significant yield change after a time point defined by day 156; and therefore, the time of plastic mulching is divided into four mulching periods, namely a mulching period with a medium-to-low yield potential, defined by days 0-58, with a yield potential of 32.8-77.5 t/ha, a mulching period with a medium-to-high yield potential, defined by days 58-119, with a yield potential of 77.5-122.2 t/ha, a mulching period with a high yield potential, defined by days 119-156, with a yield potential of 122.2-138.8 t/ha, and an ineffective mulching period after day 156, with no significant yield increase;

(4) uncovering the plastic film at the optimal uncovering time by allowing the plastic film to biodegrade; or uncovering the plastic film at the optimal uncovering time by removing the soil on the plastic film, cleaning the plastic film out of the sugarcane field by a plastic film recycling machine or a manual recycling method, and sending a recycled plastic film to a plastic film recycling station for a centralized treatment; and (5) harvesting the sugarcane after the sugarcane has matured, wherein the sugarcane has a yield of 122.2-138.8 t/ha.

2. The method for tapping the yield potential of the sugarcane by controlling the uncovering time of the plastic mulching according to claim 1, wherein the plastic film has a width of 1.5-1.8 m and a thickness of 0.010-0.012 mm.

3. The method for tapping the yield potential of the sugarcane by controlling the uncovering time of the plastic mulching according to claim 1, wherein the plastic film is intended for a fully mulching purpose, with an overlap of about 10 cm with an adjacent plastic film.

4. The method for tapping the yield potential of the sugarcane by controlling the uncovering time of the plastic mulching according to claim 1, wherein the predetermined thickness of the soil covered is 3-4 cm.

5. The method for tapping the yield potential of the sugarcane by controlling the uncovering time of the plastic mulching according to claim 1, wherein the optimal uncovering time for the plastic mulching is between 50 and 160 days.

* * * * *